United States Patent [19]
Black

[11] Patent Number: 4,784,890
[45] Date of Patent: Nov. 15, 1988

[54] FASTENER ASSEMBLY WITH PERIPHERAL TEMPORARY ATTACHMENT LAYER

[75] Inventor: Philip D. Black, Hudson, Wis.

[73] Assignee: Minnesota Mining and Manufacturing Company, St. Paul, Minn.

[21] Appl. No.: 111,078

[22] Filed: Oct. 16, 1987

Related U.S. Application Data

[63] Continuation of Ser. No. 876,687, Jun. 20, 1986, abandoned.

[51] Int. Cl.⁴ .............................................. A44B 21/00
[52] U.S. Cl. ..................................... 428/100; 428/120; 428/194; 428/900; 24/306; 24/443; 24/444
[58] Field of Search ............... 428/100, 900, 120, 329, 428/194; 24/306, 443, 444; 264/46.7

[56] References Cited

U.S. PATENT DOCUMENTS

| | | | |
|---|---|---|---|
| 4,563,380 | 1/1986 | Black et al. | 428/100 |
| 4,617,214 | 10/1986 | Billarant | 428/40 |
| 4,726,975 | 2/1988 | Hatch | 428/100 |

FOREIGN PATENT DOCUMENTS 2556271 6/1985 France.
8319926 6/1985 France.

Primary Examiner—Alexander S. Thomas
Attorney, Agent, or Firm—Donald M. Sell; William L. Huebsch

[57] ABSTRACT

An elongate fastener assembly comprising an elongate flexible polymeric backing strip from which project a multiplicity of headed stems adapted to engage loops on materials pressed against the heads, and an open porous permanent attachment layer attached to the surface of the backing strip opposite the stems which has sufficient open area to receive foam to permanently attach the fastener assembly to a foamed article. The fastener assembly has a temporary attachment layer comprising granular ferromagnetic material along both sides of the backing strip, which temporary attachment layer is adapted to be attracted by magnets to temporarily hold the fastener assembly in position during a foaming process and restrict the foam from contacting the headed stems.

3 Claims, 2 Drawing Sheets

FASTENER ASSEMBLY WITH PERIPHERAL TEMPORARY ATTACHMENT LAYER

This is a continuation of application Ser. No. 876,687, filed June 20, 1986, now abandoned.

Technical Field

The present invention relates generally to fasteners, and particularly to the type of fastener used to attach upholstery fabrics with loops on their back surfaces to foam seat cushions.

Background Art

A known fastener assembly currently used to attach upholstery fabrics with loops on their back surfaces to foam seat cushions of the type used in automobiles includes a polymeric backing strip, a multiplicity of stems each secured at one end to and projecting from a first surface of the backing strip and having enlarged heads at their ends opposite the backing strip adapted to engage the loops on the upholstery material when the material is pressed against the heads, and an open porous permanent attachment layer attached to the surface of the backing strip opposite the stems. The fastener assembly is placed with its heads adjacent to the inner wall of a seat mold, a seat cushion is foamed in the mold, and the permanent attachment layer has sufficient open areas to afford movement of foam into it to permanently attach the fastener assembly to the newly foamed seat cushion. Subsequently the back of the upholstery material can be pressed against the fastener assembly whereupon the loops on the upholstery material will engage the heads on the fastener to hold the upholstery material along the contour of the cushion.

This fastener assembly also typically includes a central strip of steel or (as taught in U.S. Pat. No. 4,563,380) ferromagnetic particles dispersed within a polymeric bonding material that provides means by which the fastener assembly can be magnetically held in a predetermined location against the inner wall of the mold in which the seat cushion is foamed. While such a strip affords enough magnetic attraction to hold the fastener assembly in place prior to foaming, it has not provided a sufficient seal between the edges of the fastener assembly and the mold to keep foam from passing around the edges of the fastener assembly, covering some of the heads of the fastener, and requiring cleaning of those heads before the upholstery material is applied. Thus some known fastener assemblies such as those described in French Patent Applications Nos. 83-19926 and 84-10033 and U.S. Pat. No. 4,563,380 have included an elongate cover layer overlying the heads and having longitudinal edge parts attached to the edges of the backing strip. This cover layer is positioned between the heads and the wall of the mold during the foaming process to prevent foam from moving into the spaces around the heads and stems, and is adapted to then be removed to expose the heads by being melted or shrunk during a heat cure process for the cushion or by being manually stripped away. Any such fastener assembly, however, is made more expensive by the presence of the cover layer, and either requires labor to strip away the cover layer or provides the possibility that the cover layer will not properly melt or shrink.

DISCLOSURE OF THE INVENTION

The present invention provides an elongate fastener assembly generally of the type described above which has a magnetically attractable temporary attachment layer that can adequately seal the fastener in a mold so that a cover layer of the type described above is not needed to prevent foam from moving into spaces around the heads and stems of the fastener assembly during the seat molding process.

According to the present invention there is provided an elongate fastener assembly comprising a flexible polymeric backing strip, a multiplicity of stems each secured to one end to the backing strip and projecting generally normally to one of its major surfaces and having enlarged heads at their ends opposite the backing strip adapted to engage loops on materials pressed against the heads, and an open porous permanent attachment layer attached to the major surface of the backing strip opposite the stems which has sufficient open area to afford movement of foam into the permanent attachment layer to permanently attach the fastener assembly to a foamed article. The fastener assembly also has a temporary attachment layer comprising ferromagnetic material, which temporary attachment layer is adapted to be attracted by magnets to temporarily hold the fastener assembly in a predetermined position during the foaming process. In the present invention this temporary attached layer is improved in that it comprises two longitudinally extending strips containing ferromagnetic particles (e.g., iron) along the opposite sides of the headed projecting stems on the backing strip, which longitudinally extending strips are adapted to be held in place by magnets in the mold along the sides of a groove adapted to receive the headed stems, and the fastener assembly further includes means for restricting foam from passing between the opposite ends of the fastener assembly and the mold so that the fastener assembly can be used in the mold without the need for a cover layer over the headed stems.

BRIEF DESCRIPTION OF THE DRAWING

The present invention will be more thoroughly explained with reference to the accompanying drawing in which like numbers refer to like parts in the several views, and wherein.

DESCRIPTION OF THE PREFERRED EMBODIMENT

Figure 3:
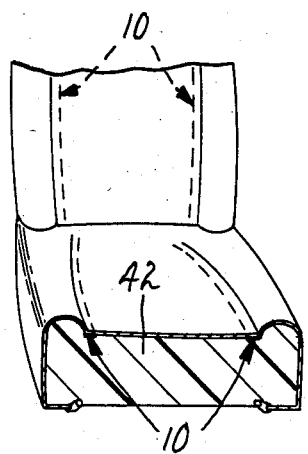
FIG. 3 is a reduced sectional view of four fastener assemblies of the type shown in FIG. 1 attached to foam seat and back cushions.

Referring now to FIGS. 1 through 5 of the drawing, there is shown an elongate fastener assembly according to the present invention, generally designated by the reference numeral 10.

Generally, the elongate fastener assembly 10 comprises (1) a flexible polymeric backing strip 12 having first and second major surfaces 14 and 16; (2) a multiplicity of stems 18 each secured at one end to the backing strip 12, projecting generally normally from the first surface 14 of the backing strip 12, and having enlarged heads 20 at their ends opposite the backing strip 12 adapted to engage loops on materials pressed against the heads 20; (3) an open porous permanent attachment layer 22 attached as by a layer of adhesive to the second major surface 16 of the backing strip 12, which permanent attachment layer 22 has sufficient open area to afford movement of foam into it to permanently attach the fastener assembly to a foamed article; (4) a temporary attachment layer 23 including ferromagnetic material (e.g., iron) comprising two longitudinally extending strips 24 extending along the opposite sides of the backing strip 12, which temporary attachment layer 23 is adapted to be attracted by magnets 25 (FIG. 2) to temporarily hold the fastener assembly 10 in position in a mold 26 during a foaming process with the stems 18 and heads 20 on the fastener assembly received in a groove in the wall of the mold 26; and restricting means for restricting foam from passing between the opposite ends of the fastener assembly 10 and the mold 26.

The temporary attachment layer 23 of the strip material 10 preferably comprises ferromagnetic particles coated on or dispersed in a flexible support layer, which support layer has essentially the same shrinkage as the backing strip 12 when the backing strip 12 shrinks during exposure to temperatures around 125° C. Thus such temperatures which may be involved in the seat forming process will not cause a substantial relative change in length between the backing strip 12 and the temporary attachment layer 23.

Preferably the temporary attachment layer 23 is formed by using a binder to adhere iron granules to one surface of a polymeric support film. One such suitable temporary attachment layer 23 can be formed by mixing a binder solution of 100 parts by weight of Kraton 1101, 2 parts by weight of Ethanox 330 and 300 parts by weight of Toluene, adding 250 grams of 100 mesh iron grit to 100 grams of the binder solution; and coating a layer of the resultant slurry 0.005 to 0.010 inch thick when wet on a 0.005 inch thick high density polyethylene film and allowing the slurry to dry. Another acceptable temporary attachment layer 23 can be formed by coating the resultant slurry onto 60 pound bleached craft paper backing. Still another temporary attachment layer 23 that can pass the fire retardant tests of Federal Aviation Regulation 25. 853, paragraphs (a) and (b), can be made by mixing a slurry of 1 part by weight of neoprene, 5 parts by weight of Toluene, and 5 parts by weight of 100 mesh iron grit, and coating a layer of the resultant slurry about 0.027 inch thick when wet on coated release liner obtained from Daubert Coated Products, Oak Brook, Ill. 60521. Additionally, but less preferably, the temporary attachment layer 23 could comprise ferromagnetic particles dispersed in a polymeric bonding material in accordance with the teachings of U.S. Pat. No. 4,563,380 incorporated herein by reference.

Preferably the backing strip 12 with its attached stems 18 and heads 20 is made in accordance with U.S. Pat. No. 4,454,183 (incorporated herein by reference), and particularly in accordance with the embodiment described with reference to FIG. 7 of that patent which is made by a method described in U.S. Pat. No. 4,290,832 (also incorporated herein by reference). Versions of that structure, including a version that can pass the flame retardant tests of Federal Aviation Regulation 25. 853, paragraphs (a) and (b), are available under the trademark "Scotchmate" from Minnesota Mining and Manufacturing Company, St. Paul, Minn. Alternately, however, an integrally molded structure providing a backing strip, stems and heads could be used.

Figure 4:
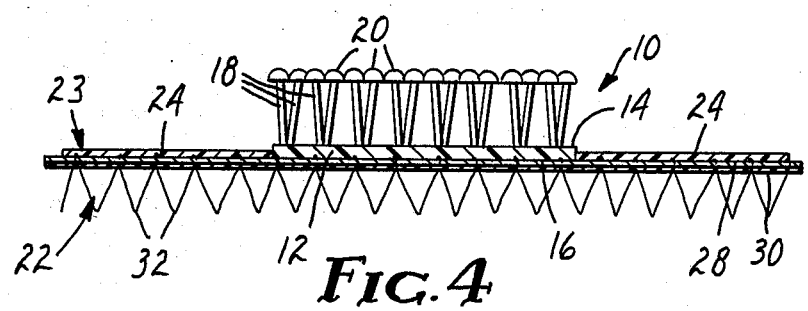
FIG. 4 is an enlarged cross sectional view of the fastener assembly of FIG. 1.

The permanent attachment layer 22 illustrated in FIG. 4 can be formed by a stitch bonding process such as can be performed by a Malimo TM type Malipol Stitch-Knitting Machine manufactured by Textima in East Germany and distributed in the United States by Chima, Ic. of Reading, Pa., operated in its double bar mode to both (1) stitch together (e.g., as with 90 denier polyester yarn) a layer 28 of open fused cross laid airy fabric (e.g., the fabric sold under the trade designation CC2001 by Conwed Corp., St. Paul, Minn. and a polymeric film 30 (e.g., 0.002 inch thick ethylene vinyl acetate) to form a base layer for the permanent attachment layer 22; and (2) form loops 32 with monofilaments (e.g., 293 denier polypropylene monofilaments) around sinkers (e.g., 3 millimeter sinkers), which loops 32 project from the side of the film 30 opposite the fabric 28. The loops 32 included in the permanent attachment layer 22 provide a substantial percentage of open area to permit the inflow of foam.

Alternately, the permanent attachment layer 22 could be any other open structure capable of allowing the inflow of foam to which the backing strip 12 could be securely anchored, such as of fine denier polypropylene fibers (e.g., 3 to 4 denier fibers 7.6 to 10 centimeters (3 to 4 inches long) that have been formed into a nonwoven mat and needled together to provide a strong porous structure (e.g., 0.2 centimeter (0.080 inch) thick by 4.5 centimeters (1.75 inch) wide) with a substantial percentage of open area to permit the inflow of foam. Another suitable permanent attachment layer 22 that can pass the flame retardant tests of Federal Aviation Regulation 25. 853, paragraphs (a) and (b) can be made from a product commercially designated "Duron 17307" available from Foothill Industries, Hickory, N.C.

The backing strip 12 and the strips 24 of the temporary attachment layer 23 are preferably attached to the permanent attachment layer 22 by an adhesive such as a thermoplastic resin of the polyolefin type which can be applied to these parts between nip rollers, one of which rollers is notched to receive the heads 20 and stems 18 of the backing strip 12.

Figure 1:
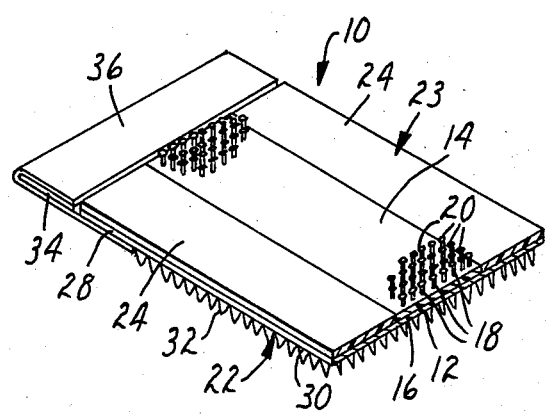
FIG. 1 is a fragmentary perspective view of a fastener assembly according to the present invention.
Figure 5:
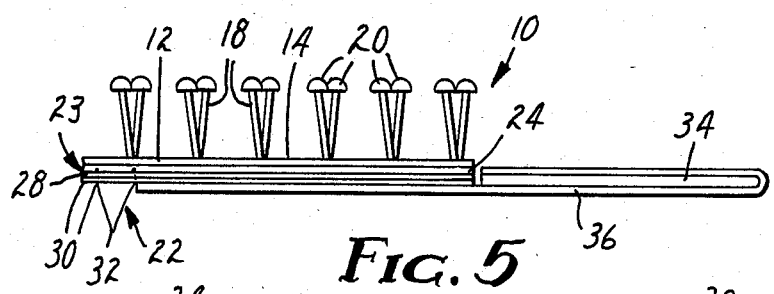
FIG. 5 is an enlarged fragmentary edge view of the fastener assembly of FIG. 1.
Figure 6:
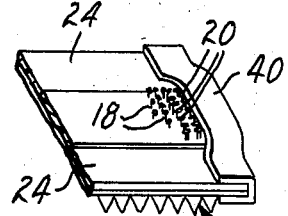
FIG. 6 is a fragmentary perspective of a first alternate embodiment of a fastener assembly according to the present invention.
Figure 7:
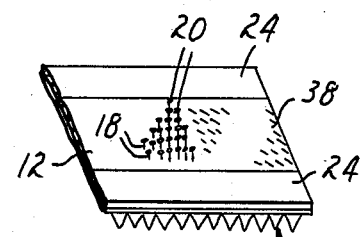
FIG. 7 is a fragmentary perspective of a second alternate embodiment of a fastener according to the present invention.

The restricting means for restricting foam from passing between the opposite ends of the fastener assembly and the mold 26, may, as illustrated in FIGS. 1 and 5, by portions 34 of the temporary attachment layer 23 that extend across both ends of the backing strip 12 and are attached to the permanent attachment layer 22 by a short length 36 of polymeric film (e.g., polypropylene) adhered around the temporary attachment layer portion 34 and having an end attached to the permanent attachment layer 22 as by ultrasonic staking. For that form of the restricting means, magnets should be provided in the mold 26 to magnetically hold the attachment layer portions 34 in place. Alternately, as shown in FIGS. 6 and 7 such restricting means can be provided by providing dam-like structures across both ends of the fastener assembly 10 adapted to extend beyond the ends of the groove in the mold wall in which the stems 18 and heads 20 are received. Such a dam-like structure 38 may be formed by attaching a piece 40 of pressure sensitive adhesive coated foam around the ends of the backing strip 12 and permanent attachment layer 22 as is shown in FIG. 6, or by melting or cutting the headed stems 18 from the backing strip 12 adjacent the ends of the fastener as is shown in FIG. 7.

Figure 2:
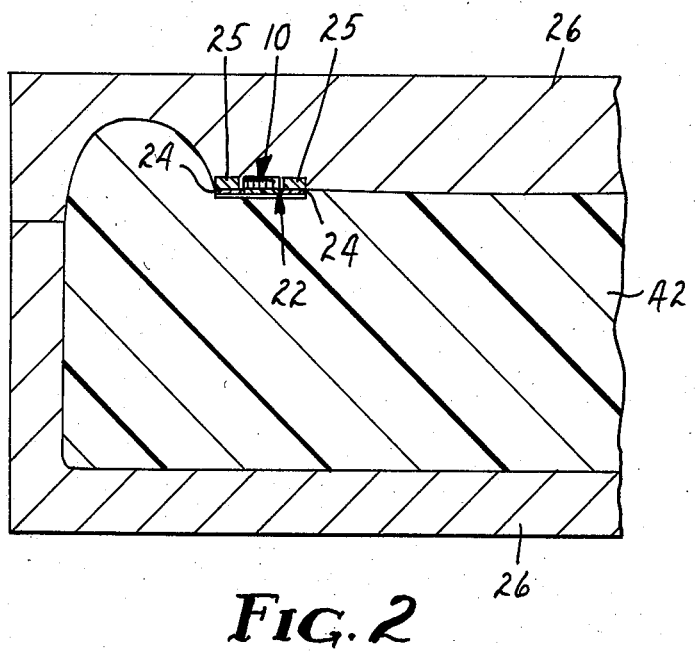
FIG. 2 is a reduced sectional view of the fastener assembly of FIG. 1 being magnetically held in a fragment of a mold used to mold seat cushions.
Figure 8:
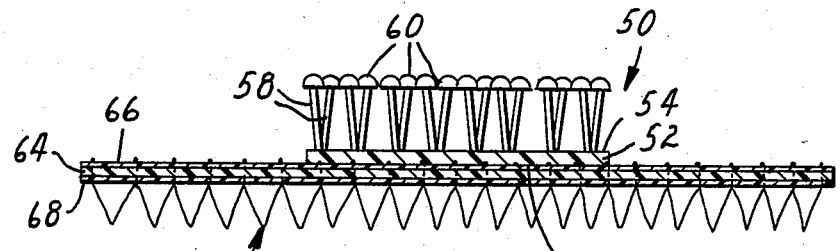
FIG. 8 is a cross sectional view of a third alternate embodiment of a fastener assembly according to the present invention.

In use the fastener assembly 10 (as illustrated in FIG. 2) is positioned with the portions of the fastener assembly 10 flanking and at the ends of the stems 18 and heads 20 against the wall of the mold 26 in which a seat 42 is to be foamed with the stems 18 and heads 20 postioned in the groove in that wall adapted to receive them, and the fastener assembly 10 temporarily held in place by magnetic attraction between the iron particles in the temporary attachment layer 23 and a source of magnetism such as the magnets 25 embedded in the wall of the mold 26 along the opposite longitudinal edges of the groove and adjacent the temporary attachment layer 23. The mold 26 is then closed and filled with foam to form the seat 42, with the foam entering the porous permanent attachment layer 22 to secure the fastener assembly 10 in the seat with its heads 20 at the outer surface of the seat 42. During formation of the seat 42 the attraction between the magnets 25 and the strips 24 of the temporary attachment layer 23 insures that foam does not flow into the groove around the stems 18 and under the heads 20 to restrict their subsequent engagement with loops on a fabric covering for the seat 42 (not shown). FIG. 6 illustrates an alternate embodiment of an elongate fastener assembly according to the present invention generally designated by the reference numeral 50.

The structure of the fastener assembly 50 is essentially the same as the structure of the fastener assembly 10 in that it comprises (1) a flexible polymeric backing strip 52; (2) a multiplicity of stems 58 each secured at one end to the backing strip 52, projecting generally normally from a first surface 54 of the backing strip 52, and having enlarged heads 60 at their ends opposite the backing strip 52 adapted to engage loops on material pressed against the heads 60; (3) an open porous permanent attachment layer 62 attached to a second major surface 56 of the backing strip 52, which permanent attachment layer 62 has sufficient open area to afford movement of foam into it to permanently attach the fastener assembly to a foamed article; and (4) a temporary attachment layer 64 including ferromagnetic material having portions extending along the opposite sides of the backing strip 52, which temporary attachment layer 64 is adapted to be attracted by magnets to temporarily hold the fastener assembly 50 in position during a foaming process. Each of those parts of the fastener assembly 50 have essentially the same structure or structural possibilities as the structure of corresponding components of the fastener assembly 10 described above except that the temporary attachment layer 64 is sandwiched between a fabric 66 and a film 68 included in a base layer for the permanent attachment layer 62, is stitched into the permanent attachment layer 62 by the stitch bonding process that forms loops 70 for the permanent attachment layer 62, and has a portion extending under the backing strip 52. This structure may facilitate certain continuous manufacturing processes and can provide additional attraction to magnets in a mold.

The present invention has now been described with reference to one embodiment thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

I claim:

1. An elongate fastener assembly comprising:
    an elongate polymeric backing strip having first and second major surfaces;
    a multiplicity of stems each secured at one end to said backing strip, projecting generally normally to the first surface of said backing strip, and having enlarged heads at their ends opposite said backing strip exposed externally of said fastener assembly and adapted to engage loops on material pressed against said heads;
    an open porous permanent attachment layer attached to the second major surface of said backing strip, said permanent attachment layer having sufficient open areas to afford movement of foam into said permanent attachment layer to permanently attach said fastener assembly to a foamed article;
    a flexible temporary attachment layer comprising granular ferromagnetic material adapted to be attracted by magnets in a mold to temporarily hold said fastener assembly in position in the mold during the foaming process, said temporary attachment layer extending along opposite sides of the first major surface of the backing strip to afford a foam tight seal between the temporary attachment layer and the mold on opposite sides of the backing strip; and
    means extending across the ends of said backing strip for restricting foam from passing between the opposite ends of the fastener assembly and the mold so that engagement of said temporary attachment layer on opposite sides of the backing strip with a mold under the influence of magnets in the mold and said means extending across the ends of said backing strip can prevent foam from moving into spaces around the heads and stems of the fastener assembly during the molding process.

2. An elongate fastener according to claim 1 wherein said ferromagnetic material comprises iron particles.

3. An elongate fastener assembly comprising:
    an elongate polymeric backing strip having first and second major surfaces;
    a multiplicity of stems each secured at one end to said backing strip, projecting generally normally to the first surface of said backing strip, and having enlarged heads at their ends opposite said backing strip exposed externally of said fastener assembly and adapted to engage loops on material pressed against said heads;
    an open porous permanent attachment layer attached to the second major surface of said backing strip, said permanent attachment layer comprising a base layer and a plurality of monofilaments sewn through said base layer and forming loops projecting from the base layer, said loops providing sufficient open areas to afford movement of foam into said permanent attachment layer to permanently attach said fastener assembly to a foamed article;

a flexible temporary attachment layer comprising granular ferromagnetic material adapted to be attracted by magnets in a mold to temporarily hold said fastener assembly in position in the mold during the foaming process, said temporary attachment layer extending along opposite sides of the first major surface of the backing strip to afford a foam tight seal between the temporary attachment layer and the mold on opposite sides of the backing strip; and means extending across the ends of said backing strip for restricting foam from passing between the opposite ends of the fastener assembly and the mold so that engagement of said temporary attachment layer on opposite sides of the backing strip with a mold under the influence of magnets in the mold and said means extending across the ends of said backing strip can prevent foam from moving into spaces around the heads and stems of the fastener assembly during the molding process.

* * * * *